US009511447B2

(12) United States Patent
Lin et al.

(10) Patent No.: US 9,511,447 B2
(45) Date of Patent: Dec. 6, 2016

(54) PROCESS FOR MAKING A TURBULATOR BY ADDITIVE MANUFACTURING

(71) Applicant: GENERAL ELECTRIC COMPANY, Schenectady, NY (US)

(72) Inventors: Dechao Lin, Greer, SC (US); Srikanth Chandrudu Kottilingam, Simpsonville, SC (US); Yan Cui, Greer, SC (US); David Vincent Bucci, Simpsonville, SC (US); Xiaoxue Diao, Greenville, SC (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 14/104,363

(22) Filed: Dec. 12, 2013

(65) Prior Publication Data

US 2015/0165547 A1    Jun. 18, 2015

(51) Int. Cl.
*B23K 26/00*    (2014.01)
*B23K 10/00*    (2006.01)
(Continued)

(52) U.S. Cl.
CPC ....... *B23K 26/0078* (2013.01); *B23K 26/0081* (2013.01); *B23K 26/0608* (2013.01);
(Continued)

(58) Field of Classification Search
CPC ............ B23K 26/0078; B23K 26/0081; B23K 26/144; B23K 26/32; B23K 26/342; B23K 26/06; B23K 26/0619; B23K 2201/001; B23K 10/00; B23K 26/354
See application file for complete search history.

(56) References Cited

U.S. PATENT DOCUMENTS 6,399,217 B1    6/2002    Lee et al.
2006/0042255 A1*    3/2006    Bunker .................. F01D 25/12
60/752

(Continued)

FOREIGN PATENT DOCUMENTS

| DE | 10248548 A1 | 4/2004 |
|---|---|---|
| GB | 2378150 A * | 2/2003 |
| GB | 2453943 A | 4/2009 |

OTHER PUBLICATIONS

European Search Report and Opinion issued in connection with corresponding EP Application No. 14197238.0 on Apr. 14, 2015.

*Primary Examiner* — Geoffrey S Evans
(74) *Attorney, Agent, or Firm* — McNees Wallace & Nurick LLC

(57) ABSTRACT

A turbulator fabrication process and a fabricated article are provided. The turbulator fabrication process includes providing a system configured for directing a first fusion energy and a second fusion energy, positioning a turbulator material on a substrate, and directing the first fusion energy and the second fusion energy toward the turbulator material and the substrate. The directing of the first fusion energy and the second fusion energy modifies the turbulator material forming one or more turbulators on the substrate. The fabricated article includes a substrate and one or more turbulators formed on the substrate. Each of the one or more turbulators includes at least one root portion providing a concave transition between the substrate and the turbulator.

27 Claims, 5 Drawing Sheets

(51) Int. Cl.
  *B23K 26/06* (2014.01)
  *F23R 3/00* (2006.01)
  *B23P 15/00* (2006.01)
  *F23R 3/44* (2006.01)
  *B23K 26/32* (2014.01)

(52) U.S. Cl.
  CPC ............ *B23K 26/144* (2015.10); *B23K 26/32* (2013.01); *B23K 26/342* (2015.10); *B23P 15/008* (2013.01); *F23R 3/005* (2013.01); *F23R 3/44* (2013.01); *B23K 2201/001* (2013.01); *B23K 2203/08* (2013.01); *F23R 2900/00018* (2013.01); *F23R 2900/03045* (2013.01); *Y10T 29/49323* (2015.01)

(56) References Cited

U.S. PATENT DOCUMENTS

| 2007/0062198 A1* | 3/2007 | Huth ................ F23R 3/005 60/752 |
| 2007/0193216 A1* | 8/2007 | Woolford ............ F23R 3/002 52/782.1 |
| 2010/0034647 A1 | 2/2010 | Lee et al. |
| 2010/0115964 A1* | 5/2010 | Kirby ................ F01D 17/105 60/785 |
| 2011/0226390 A1* | 9/2011 | Chen ................ C22C 19/00 219/76.14 |
| 2011/0253680 A1* | 10/2011 | Clark ................ B23K 26/1411 219/76.1 |
| 2012/0267347 A1* | 10/2012 | Arjakine ............ B05B 7/228 219/121.64 |
| 2012/0304654 A1* | 12/2012 | Melton ................ F23R 3/002 60/746 |
| 2013/0270750 A1* | 10/2013 | Green ................ B29C 67/0077 264/497 |
| 2013/0280092 A1* | 10/2013 | Xu ................ C30B 29/52 29/889.721 |
| 2014/0099476 A1* | 4/2014 | Subramanian ........ B22F 5/009 419/7 |
| 2014/0348692 A1* | 11/2014 | Bessac ................ B22F 3/1055 419/53 |
| 2015/0004045 A1* | 1/2015 | Ljungblad ............ B22F 3/1035 419/47 |
| 2015/0159257 A1* | 6/2015 | Lin ................ C23C 4/085 118/724 |

* cited by examiner

PROCESS FOR MAKING A TURBULATOR BY ADDITIVE MANUFACTURING

FIELD OF THE INVENTION

The present invention is directed to a fabrication process and a fabricated article. More specifically, the present invention is directed to a turbulator fabrication process and a fabricated article including turbulators.

BACKGROUND OF THE INVENTION

Many components, such as gas turbine combustors, are exposed to increased temperatures during operation. For example, combustion within a combustion chamber of a traditional gas turbine may produce flame temperatures exceeding 3,900° F. Often, the components include tolerance temperatures well below the increased temperatures experienced during operation. To maintain material temperatures below the tolerance temperature, cooling features may be incorporated into the component.

One cooling feature includes providing continuous linear turbulators on an exterior surface of a component, such as a combustor liner. The continuous linear turbulators include protruding bodies placed in the flow path over the exterior surface of the component to disrupt the flow. The disruption in the flow creates shear layers and high turbulence to enhance heat transfer on the exterior surface and increase convective cooling of the component.

Often, a plurality of turbulators is formed on the exterior surface of the component. Forming the plurality of turbulators may require an extended period of time, which decreases efficiency and increases both cost and fabrication time for the component. For example, forming 90 turbulators by machining may take upwards of 24 hours for superalloys.

BRIEF DESCRIPTION OF THE INVENTION

In an exemplary embodiment, a turbulator fabrication process includes providing a system configured for directing a first fusion energy and a second fusion energy, positioning a turbulator material on a substrate, and directing the first fusion energy and the second fusion energy toward the turbulator material and the substrate. The directing of the first fusion energy and the second fusion energy modifies the turbulator material forming one or more turbulators on the substrate.

In another exemplary embodiment, a turbulator fabrication process includes providing a system configured for directing a first fusion energy and a second fusion energy, positioning a turbulator material on a substrate, and directing the first fusion energy and the second fusion energy toward the turbulator material and the substrate. The directing of the first fusion energy and the second fusion energy modifies the turbulator material forming one or more turbulators on the substrate, and proceeds in a direction of formation at a rate of at least 15 inches per minute.

In another exemplary embodiment, a fabricated article includes a substrate and one or more turbulators formed on the substrate. Each of the one or more turbulators includes at least one root portion providing a concave transition between the substrate and the turbulator.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a fabrication process and a fabricated article. Embodiments of the present disclosure, in comparison to fabrication processes and fabricated articles not using one or more of the features disclosed herein, increase turbulator fabrication efficiency, increase turbulator formation speed, provide turbulators including concave roots at increased fabrication speeds, or a combination thereof.

Figure 1:
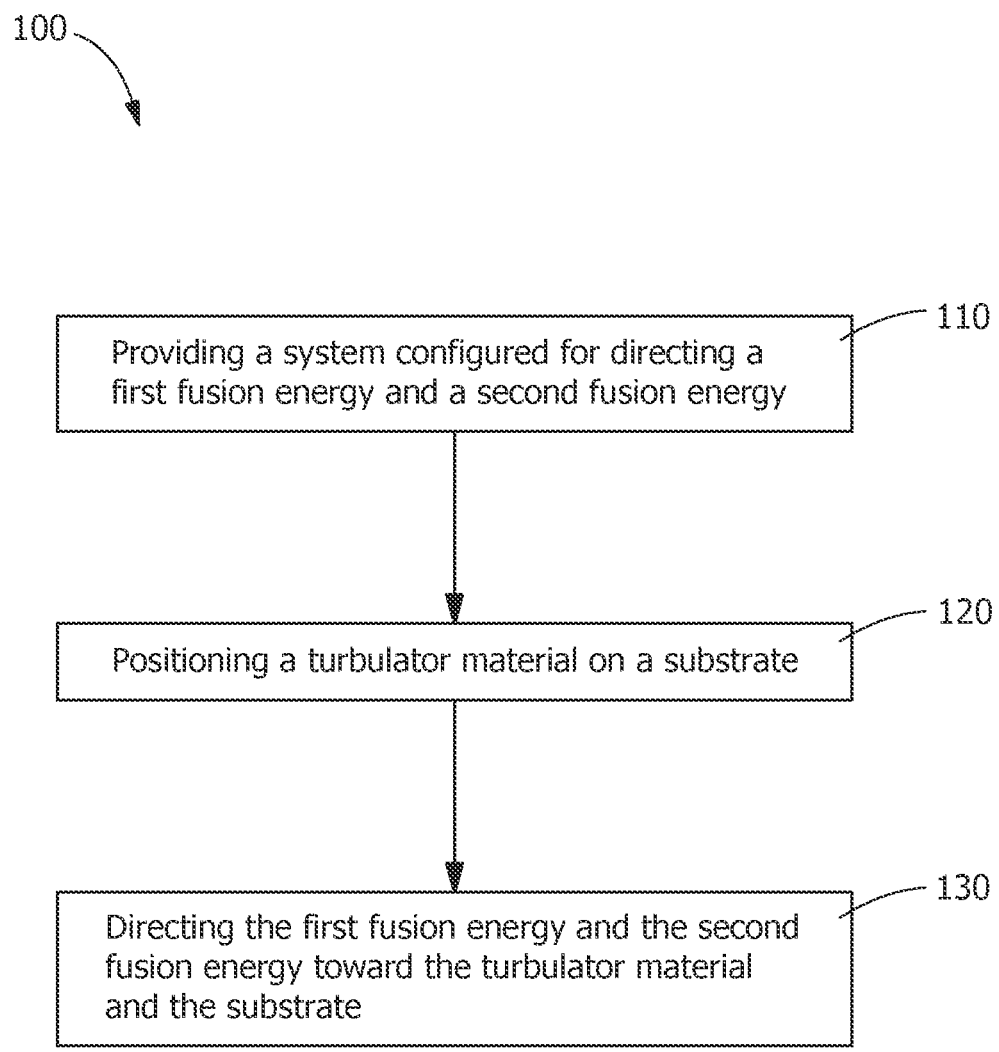
FIG. 1 shows a flow chart of a fabrication process, according to an embodiment of the disclosure.
Figure 2:
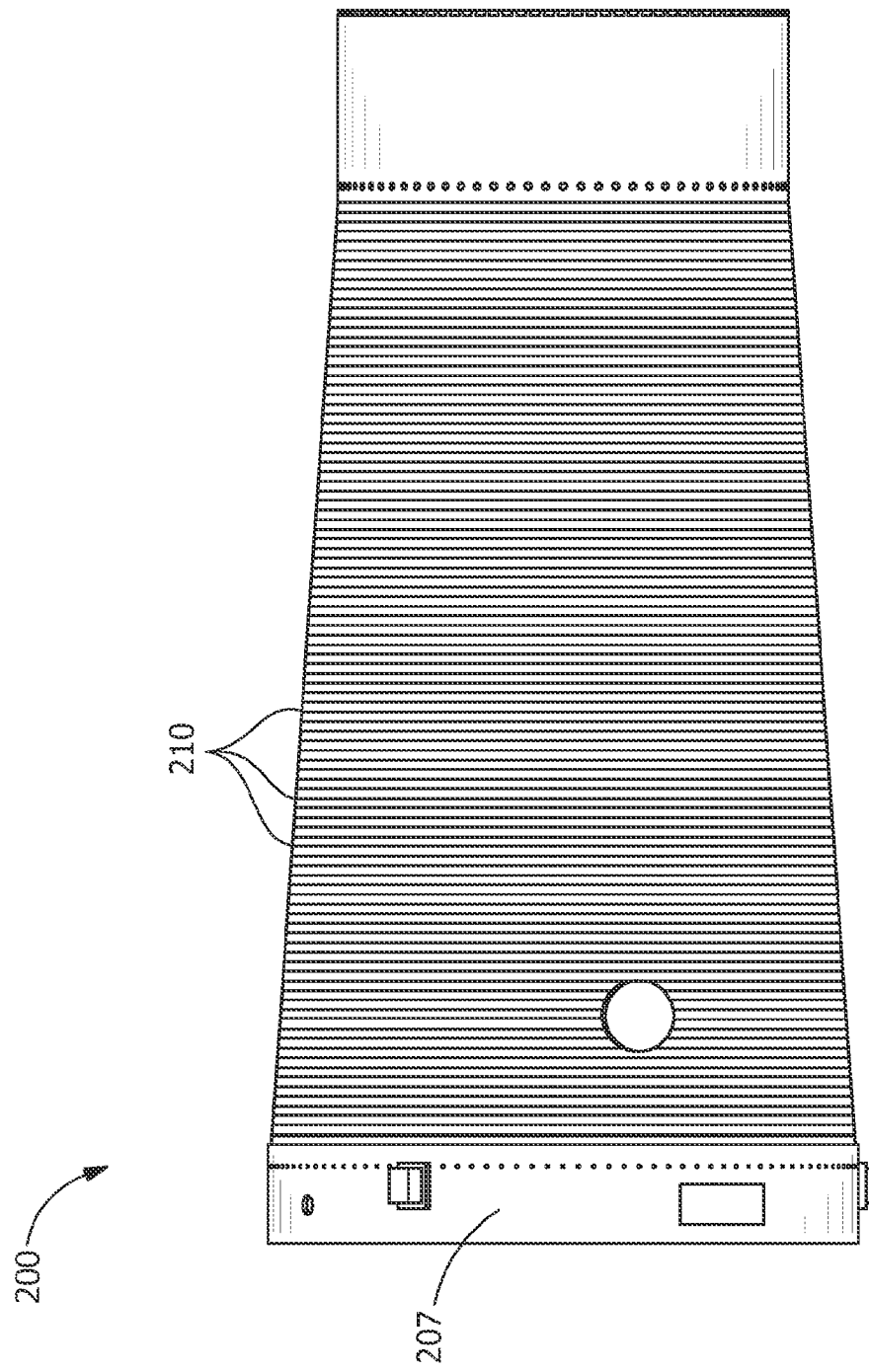
FIG. 2 is a perspective view of a component having a plurality of turbulators formed thereon, according to an embodiment of the disclosure.

Referring to FIGS. 1-2, in one embodiment, a turbulator fabrication process 100 includes providing a system 200 configured for directing a first fusion energy 201 and a second fusion energy 202 (step 110), positioning a turbulator material 205 on a substrate 207 (step 120), and directing the first fusion energy 201 and the second fusion energy 202 toward the turbulator material 205 and the substrate 207 (step 130). The directing of the first fusion energy 201 and the second fusion energy 202 modifies the turbulator material 205 to form one or more turbulators 210 on the substrate 207. As used herein, the term "turbulator" refers to a protruding body configured to be placed in a flow path to transform laminar flow into turbulent flow. The turbulent flow increases a cooling effect of the fluid flowing over the substrate 207.

Referring to FIG. 2, the substrate 207 includes any suitable substrate, such as, but not limited to, a portion of a combustion liner, a convex surface, a concave surface, a planar surface, or a combination thereof. Substrate materials include, but are not limited to, composite materials, such as a ceramic matrix composite, superalloys, a nickel-based alloy, an iron-based alloy, a cobalt-based alloy, or a combination thereof.

Figure 3:
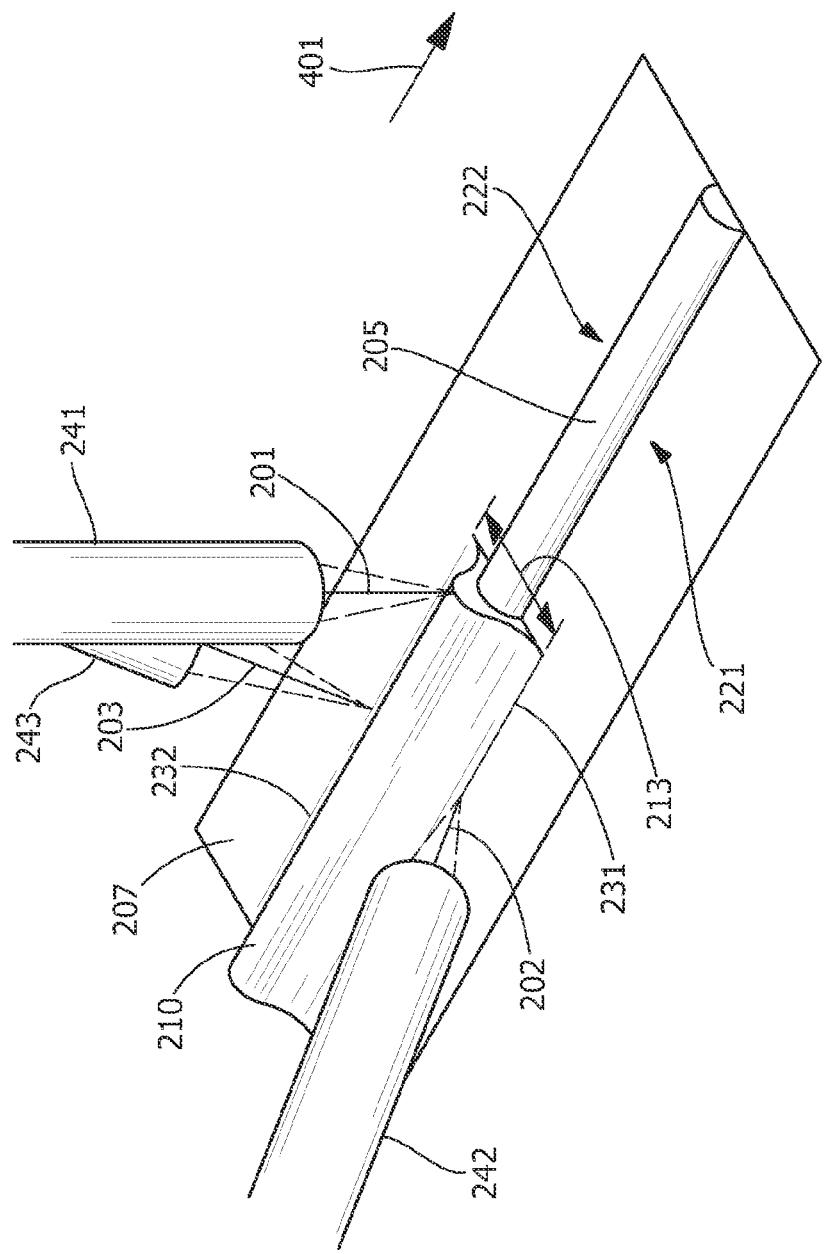
FIG. 3 is a process view of a process for forming a turbulator, according to an embodiment of the disclosure

Referring to FIG. 3, positioning the turbulator material 205 on the substrate 207 (step 120) includes providing the turbulator material 205 to the substrate 207 in any suitable configuration for forming a predetermined shape, orientation, and/or spacing of the one or more turbulators 210. The turbulator material 205 positioned on the substrate 207 includes a first interface 221 and a second interface 222 between the turbulator material 205 and the substrate 207. The first interface 221 corresponds to a first side 231 of the turbulator 210 formed from the turbulator material 205, and the second interface 222 corresponds to a second side 232 of the turbulator 210 formed from the turbulator material 205. One suitable configuration for providing the turbulator material 205 includes a bead at least substantially devoid of concave surfaces. Another suitable configuration includes providing the turbulator material 205 around portions of the substrate 207, or entirely around the substrate 207. For example, providing the bead at least substantially devoid of concave surfaces extending around the combustion liner. After positioning of the turbulator material 205, the directing of the fusion energy (step 130) forms the one or more turbulators 210 from the turbulator material 205. Suitable turbulator material 205 includes, but is not limited to, a ceramic matrix composite, a superalloy, a high temperature metal, or a combination thereof.

The turbulator fabrication process 100 permits formation of the one or more turbulators 210 on various substrate profiles. During the turbulator fabrication process 100, the forming of the one or more turbulators 210 from the turbulator material 205 includes a linear uninterrupted process, a linear interrupted process, or a non-linear process. The type of process for forming the one or more turbulators 210 is at least partially dependent upon the configuration of the turbulator material 205 positioned on the substrate 207. For example, in one embodiment, the one or more turbulators 210 extend around the substrate 207, and are formed with the linear uninterrupted process from the turbulator material 205 extending around the substrate 207. In another example, the one or more turbulators 210 extend around portions of the substrate 207, and are formed with the linear interrupted process from the turbulator material 205 extending around portions of the substrate 207. In yet another example, the one or more turbulators 210 extend around portions of the substrate 207, and are formed with the non-linear process from the turbulator material 205 extending around portions of the substrate 207.

Figure 4:
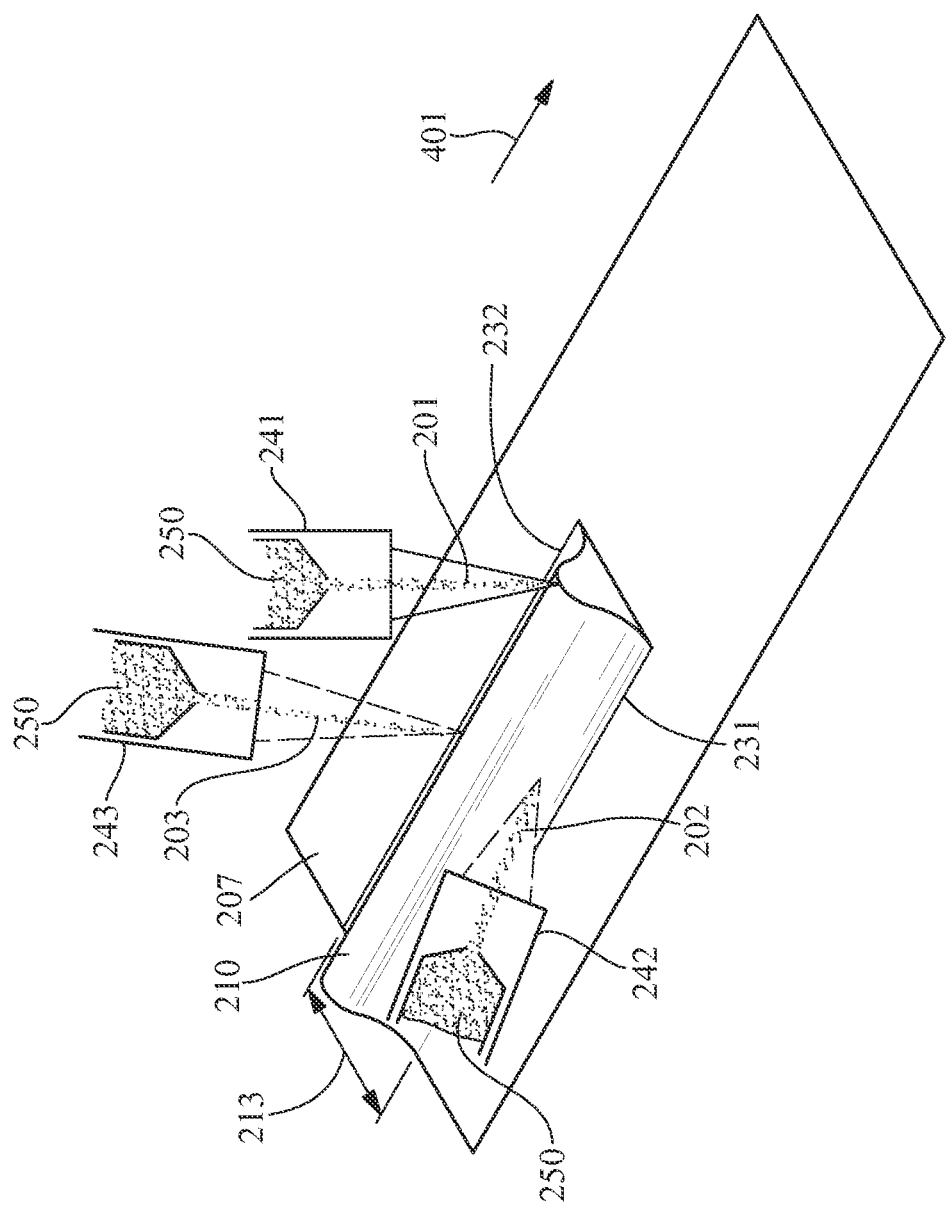
FIG. 4 is a process view of a process for forming a turbulator, according to an embodiment of the disclosure.
Figure 5:
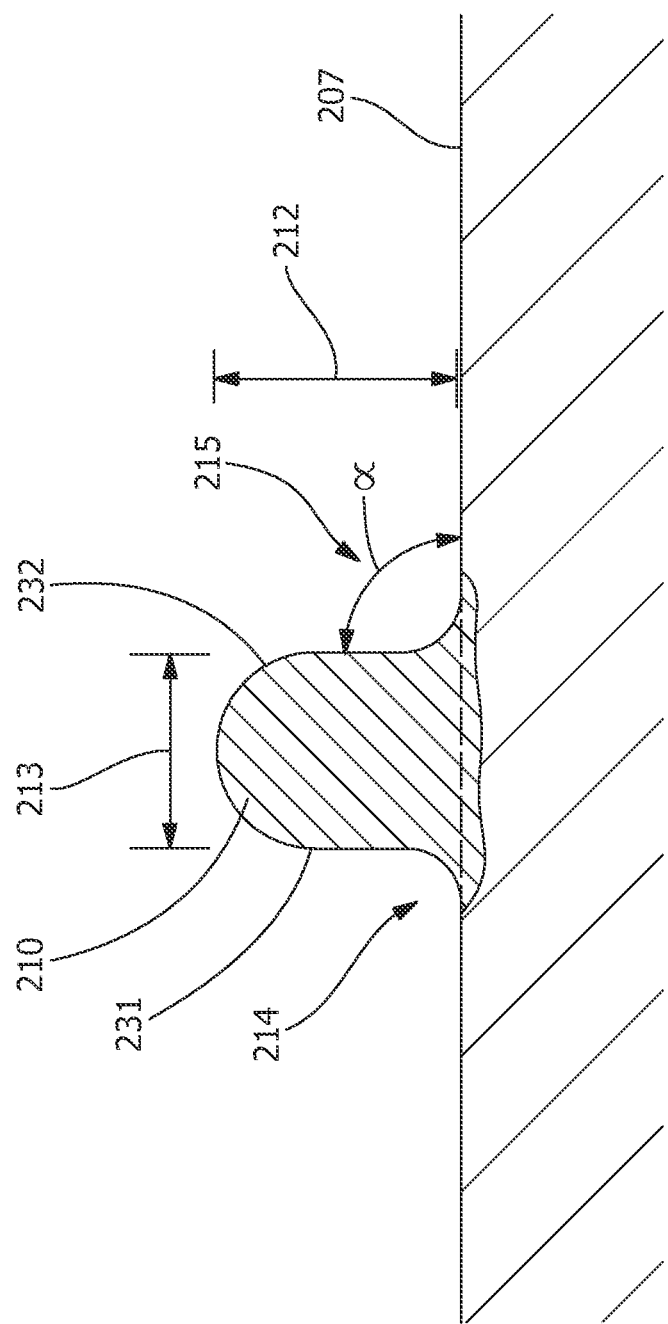
FIG. 5 is an enlarged cross-section view of a turbulator, according to an embodiment of the disclosure.

Referring to FIGS. 3-5, the first fusion energy 201 is directed toward the turbulator material 205 and the substrate 207 to form a height 212 and/or a width 213 of the turbulator 210 (see FIG. 5). The first fusion energy 201 is directed from a first fusion energy source 241, such as, but not limited to, laser energy, an arc beam, a plasma beam, or a combination thereof. The height 212 of the turbulator 210 includes any suitable height for disrupting laminar flow and/or introducing turbulence into a fluid flow. Suitable heights include, but are not limited to, up to about 1.27 mm (0.05 inches), up to about 0.76 mm (0.03 inches), between about 0.25 mm (0.01 inches) and about 1.02 mm (0.04 inches), or any combination, sub-combination, range, or sub-range thereof. In another embodiment, the width 213 of the turbulator 210 includes any suitable width for providing support to the turbulator 210. Suitable widths include, but are not limited to, up to about 1.27 mm (0.05 inches), up to about 0.76 mm (0.03 inches), between about 0.25 mm (0.01 inches) and about 1.02 mm (0.04 inches), or any combination, sub-combination, range, or sub-range thereof. In a further embodiment, the width 213 is similar, or substantially similar, to the height 212. In an alternate embodiment, the width 213 differs from the height 212.

The second fusion energy 202 is directed toward the turbulator material 205 and the substrate 207 to form a first root portion 214 on a first side 231 and/or a second root portion 215 on a second side 232 of the turbulator 210. The second fusion energy 202 is directed from a second fusion energy source 242, such as, but not limited to, laser energy, an arc beam, a plasma beam, or a combination thereof. In one embodiment, the second fusion energy 202 is directed toward the first interface 221 to form the first root portion 214 on the first side 231 of the turbulator 210. In another embodiment, the second fusion energy 202 is split to direct the second fusion energy 202 towards the first interface 221 and the second interface 222. Directing the second fusion energy 202 toward the first interface 221 and the second interface 222 forms the first root portion 214 on the first side 231 and the second root portion 215 on the second side 232, respectively.

In one embodiment, a third fusion energy 203 is directed toward the turbulator material 205 and the substrate 207 concurrently with the first fusion energy 201 and the second fusion energy 202. The third fusion energy 203 is directed from a third fusion energy source 243, such as, but not limited to, laser energy, an arc beam, a plasma beam, or a combination thereof. In an embodiment with the third fusion energy 203, the first fusion energy 201 is directed toward the turbulator material 205 and the substrate 207, the second fusion energy 202 is directed towards the first interface 221, and the third fusion energy 203 is directed towards the second interface 222. The first fusion energy 201 forms the height 212 and/or the width 213 of the turbulator 210, while the second fusion energy 202 forms the first root portion 214 on the first side 231 of the turbulator 210 and the third fusion energy 203 forms the second root portion 215 on the second side 232 of the turbulator 210.

Referring to FIG. 5, together, the height 212 and the width 213 form a convex region of the turbulator 210 extending from the substrate 207. The first root portion 214 and the second root portion 215 form concave regions providing a transition between the substrate 207 and the convex region of the turbulator 210. In one embodiment, the first root portion 214 and/or the second root portion 215 is raised from the substrate 207 to form at least a portion of the convex region extending from the substrate 207. The transition between the substrate 207 and the convex region of the turbulator 210 includes an angle a of at least 90 degrees. In one embodiment, the concave transition forms a smooth and/or semi-circular shape having a radius including, but not limited to, up to about 1.27 mm (0.05 inches), up to about 0.76 mm (0.03 inches), between about 0.25 mm (0.01 inches) and about 1.02 mm (0.04 inches), or any combination, sub-combination, range, or sub-range thereof. The concave transition is not limited to the semi-circular shape, and may include any suitable shape not forming an acute angle between the substrate 207 and the turbulator 210.

In an alternate embodiment, the first fusion energy 201 is split at least once to direct the first fusion energy 201 toward the turbulator material 205 and the substrate 207, the first interface 221, and/or the second interface 222. In one example, the first fusion energy 201 is split once to direct the first fusion energy 201 toward the turbulator material 205 and the substrate 207, as well as the first interface 221. In another example, the first fusion energy 201 is split into three beams to direct the first fusion energy 201 toward the turbulator material 205 and the substrate 207, the first interface 221, and the second interface 222.

Referring again to FIG. 3, during the directing (step 130), the second fusion energy 202 and/or the third fusion energy 203 trail the first fusion energy 201 in a direction of formation 401. The directing of the first fusion energy 201 proceeds in the direction of formation 401 at any suitable rate for forming the turbulator 210 including the first root portion 214 and/or the second root portion 215. Suitable rates for directing the first fusion energy 201 include, but are not limited to, up to about 35 inches per minute (ipm), between about 3 ipm and about 35 ipm, between about 10 ipm and about 35 ipm, between about 20 ipm and about 35 ipm, or any combination, sub-combination, range, or sub-range thereof. The directing of the second fusion energy 202 and/or the third fusion energy 203 concurrently with the directing of the first fusion energy 201 permits increased rates for forming the turbulator 210 having the first root portion 214 and/or the second root portion 215 including the angle a. Increased rates include, but are not limited to, up to about 75 ipm, up to about 50 ipm, between about 10 ipm and about 50 ipm, between about 15 ipm and about 45 ipm, between about 10 ipm and about 30 ipm, between about 30 ipm and about 50 ipm, between about 20 ipm and about 40 ipm, or any combination, sub-combination, range, or sub-range thereof.

The first fusion energy 201, the second fusion energy 202, and the third fusion energy 203 include any suitable power energy source, such as, but not limited to, a 2 kW laser source. The first fusion energy 201 is directed towards the turbulator material 205 and the substrate 207 with increased power as compared to the second fusion energy 202 and/or the third fusion energy 203. For example, in one embodiment, the first fusion energy 201 includes any suitable power for forming the turbulator 210, such as, but not limited to, between about 600 W and about 800 W, between about 650 W and about 750 W, between about 675 W and about 725 W, about 700 W, or any combination, sub-combination, range, or sub-range thereof. In another embodiment, the second fusion energy 202 and/or the third fusion energy 203 includes any suitable power for forming the first root portion 214 and/or the second root portion, such as, but not limited to, between about 200 W and about 400 W, between about 250 W and about 350 W, between about 275 W and about 325 W, about 300 W, or any combination, sub-combination, range, or sub-range thereof.

Referring to FIG. 4, in one embodiment, a powder feeding 250 is provided concurrently with the first fusion energy 201, the second fusion energy 202, and/or the third fusion energy 203. The powder feeding 250 deposits a powder material simultaneously with the directing of the fusion energy (step 130). In one embodiment, the powder feeding 250 provided concurrently with the first fusion energy 201 deposits the powder material on the substrate 207 to position the turbulator material 205 (step 120) simultaneously with the directing of the fusion energy (step 130). In an alternate embodiment, after positioning the turbulator material 205 on the substrate 207 (step 120), the powder feeding 250 provided concurrently with the first fusion energy 201 deposits the powder material on the turbulator material 205 to increase the height 212 and/or the width 213 of the turbulator 210. The powder feeding 250 provided concurrently with the second fusion energy 202 and/or the third fusion energy 203 deposits the powder material to fill an acute angle formed by the first fusion energy 201, and/or form the first root portion 214 or the second root portion 215.

The powder material includes, but is not limited to, the turbulator material 205, any material including a similar or substantially similar coefficient of thermal expansion (CTE) to the turbulator material 205, a material to impart various predetermined properties to the turbulator 210, or a combination thereof. In one embodiment, the powder material provided concurrently with the first fusion energy 201 differs from the powder material provided concurrently with the second fusion energy 202 and/or the third fusion energy 203. In an alternate embodiment, the powder material provided concurrently with the first fusion energy 201 is similar, or substantially similar, to the powder material provided concurrently with the second fusion energy 202 and/or the third fusion energy 203.

The powder feeding 250 includes a powder delivery rate corresponding to the rate at which the directing (step 130) proceeds in the direction of formation 401. Powder delivery rates include, but are not limited to, between about 50 g/m and about 200 g/m, between about 50 g/m and about 150 g/m, up to about 100 g/m, between about 50 g/m and about 100 g/m, about 99 g/m, or any combination, sub-combination, range, or sub-range thereof.

In one embodiment, the substrate 207 and/or the turbulator material 205 is pre-heated prior to the directing of at least the first fusion energy 201. The pre-heating includes directing a pre-heat energy toward the substrate 207 and/or the turbulator material 205 to increase the temperature of the substrate 207 and/or the turbulator material 205. In another embodiment, the turbulator 210 undergoes a post-heat treatment. The post-heat treatment includes directing a post-heat energy toward the turbulator 210 to either increase the temperature of the turbulator 210 or decrease a rate of cooling of the turbulator 210. The pre-heat energy and the post-heat energy include any suitable energy source, such as, but not limited to, laser energy, an arc beam, a plasma beam, or a combination thereof.

EXAMPLE

In an example, a first laser energy with a power of 700 w is directed towards an external surface of a combustion liner to form a portion of the turbulator 210. The first laser energy is directed from the first fusion energy source 241 concurrently with the powder feeding 250 to deposit the powder material on the substrate 207 and position the turbulator material 205 (step 120) simultaneously with the directing of the fusion energy (step 130). Concurrently with the directing of the first laser energy, a second laser energy with a power of 300 w is directed toward the first side 231 of the turbulator 210, and a third laser energy with a power of 300 w is directed toward the second side 232 of the turbulator 210. The first laser energy, the second laser energy, and the third laser energy proceed in the direction of formation 401 at 35 ipm, with the second laser energy and the third laser energy trailing the first laser energy to form the first root portion 214 and the second root portion 215, respectively. Together, the first laser energy, the second laser energy, and the third laser energy form 90 turbulators 210 in 2 hours or less with the height 212 of each turbulator 210 being about 0.76 mm (about 0.03 inches), the width 213 of each turbulator 210 being about 0.76 mm (about 0.03 inches), and an angle a between each turbulator 210 and the external surface being about 90 degrees. Additionally, each of the turbulators 210 includes the first root portion 214 on the first side 231 and the second root portion 215 on the second side 232, the first root portion 214 and the second root portion 215 forming the concave interfaces including a radius of about 0.76 mm (about 0.03 inches) between the turbulator 210 and the external surface of the combustion liner.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbulator fabrication process, comprising:
providing a system configured for directing a first fusion energy and a second fusion energy;
positioning a turbulator material on a substrate; and then
concurrently directing the first fusion energy toward a first side of the turbulator material extending from the substrate and the second fusion energy toward a second side of the turbulator material opposite the first side and extending from the substrate;
wherein the directing of the first fusion energy and the second fusion energy shapes the first side of the turbulator material to have a first contour and the second side of the turbulator material to have a second contour, thereby forming one or more turbulators on the substrate.

2. The fabrication process of claim 1, wherein the first fusion energy is selected from the group consisting of laser energy, an arc beam, a plasma beam, and combinations thereof.

3. The fabrication process of claim 1, wherein the second fusion energy is selected from the group consisting of laser energy, an arc beam, a plasma beam, and combinations thereof.

4. The fabrication process of claim 1, wherein the substrate is a portion of a combustion liner.

5. The fabrication process of claim 4, wherein at least one of the one or more turbulators extends around the combustion liner and the forming of the turbulator is a linear uninterrupted process.

6. The fabrication process of claim 4, wherein the turbulator extends around portions of the combustion liner and the forming of the turbulator is a linear interrupted process.

7. The fabrication process of claim 4, wherein the turbulator extends around portions of the combustion liner and the forming of the turbulator is a non-linear process.

8. The fabrication process of claim 1, wherein the substrate comprises a surface selected from the group consisting of a concave surface, a convex surface, a planar surface, and combinations thereof.

9. The fabrication process of claim 1, wherein the turbulator material is a bead at least substantially devoid of concave surfaces prior to the directing the first fusion energy and the second fusion energy.

10. The fabrication process of claim 1, wherein the directing of the first fusion energy and the second fusion energy proceeds in a direction of formation at a rate of at least 15 inches per minute.

11. The fabrication process of claim 1, wherein the first contour and the second contour each includes a concave region.

12. A turbulator fabrication process, comprising:
providing a system configured for directing a first fusion energy and a second fusion energy;
positioning a turbulator material on a substrate; and
directing the first fusion energy and the second fusion energy toward the turbulator material and the substrate;
wherein the directing of the first fusion energy and the second fusion energy modifies the turbulator material forming one or more turbulators on the substrate; and
wherein the turbulator extends from the substrate with a first root portion proximal to the substrate providing a concave transition between the substrate and a first side of a convex region of the turbulator.

13. The fabrication process of claim 12, wherein the first fusion energy is selected from the group consisting of laser energy, an arc beam, a plasma beam, and combinations thereof.

14. The fabrication process of claim 12, wherein the second fusion energy is selected from the group consisting of laser energy, an arc beam, a plasma beam, and combinations thereof.

15. The fabrication process of claim 12, wherein the substrate comprises a surface selected from the group consisting of a concave surface, a convex surface, a planar surface, and combinations thereof.

16. The fabrication process of claim 12, wherein the turbulator material is a bead at least substantially devoid of concave surfaces prior to the directing the first fusion energy and the second fusion energy.

17. The fabrication process of claim 12, wherein the directing of the first fusion energy and the second fusion energy proceeds in a direction of formation at a rate of at least 15 inches per minute.

18. The fabrication process of claim 12, wherein the substrate is a portion of a combustion liner.

19. The fabrication process of claim 18, wherein at least one of the one or more turbulators extends around the combustion liner and the forming of the turbulator is a linear uninterrupted process.

20. The fabrication process of claim 18, wherein the turbulator extends around the portions of the combustion liner and the forming of the turbulator is a linear interrupted process.

21. The fabricated article of claim 18, wherein the turbulator extends around portions of the combustion liner and the forming of the turbulator is a non-linear process.

22. The fabrication process of claim 12, wherein the turbulator extends from the substrate with a second root portion proximal to the substrate providing a concave transition between the substrate and a second side of a convex region of the turbulator.

23. The fabrication process of claim 22, wherein the first root portion and the second root portion are raised from the substrate to form at least a portion of the convex region extending from the substrate.

24. The fabrication process of claim 23, further comprising directing a third fusion energy toward the substrate, wherein the first concave portion is formed by the second fusion energy, the second concave portion is formed by the third fusion energy, and the convex region is formed by the first fusion energy.

25. The fabrication process of claim 24, wherein the process forms at least ninety of the turbulators.

26. The fabrication process of claim 24, wherein the first root portion is formed by the second fusion energy and the second root portion is formed by the third fusion energy.

27. The fabrication process of claim 24, wherein the second fusion energy and the third fusion energy trail the first fusion energy in a direction of formation.

* * * * *

UNITED STATES PATENT AND TRADEMARK OFFICE
CERTIFICATE OF CORRECTION

PATENT NO. : 9,511,447 B2
APPLICATION NO. : 14/104363
DATED : December 6, 2016
INVENTOR(S) : Lin et al.

It is certified that error appears in the above-identified patent and that said Letters Patent is hereby corrected as shown below:

In the Specification

Column 4, Line 32, delete "a" and insert -- α --, therefor.

In the Claims

Column 7, Line 3, Claim 1, delete "for directing" and insert -- for concurrently directing --, therefor.

Column 8, Line 32, Claim 20, delete "the portions" and insert -- portions --, therefor.

Column 8, Line 34, Claim 21, delete "fabricated article" and insert -- fabrication process --, therefor.

Column 8, Line 40, Claim 22, delete "of a" and insert -- of the --, therefor.

Signed and Sealed this
Ninth Day of May, 2017

Michelle K. Lee
*Director of the United States Patent and Trademark Office*